(12) United States Patent
Winblad et al.

(10) Patent No.: US 11,386,029 B2
(45) Date of Patent: Jul. 12, 2022

(54) DIRECT MEMORY ACCESS CONTROLLER

(71) Applicant: Nordic Semiconductor ASA, Trondheim (NO)

(72) Inventors: Marko Winblad, Trondheim (NO); Markku Vähätaini, Trondheim (NO); James Nevala, Trondheim (NO); Matti Tiikkainen, Trondheim (NO); Hannu Talvitie, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/059,391

(22) PCT Filed: May 28, 2019

(86) PCT No.: PCT/EP2019/063821
§ 371 (c)(1),
(2) Date: Nov. 27, 2020

(87) PCT Pub. No.: WO2019/229063
PCT Pub. Date: Dec. 5, 2019

(65) Prior Publication Data
US 2021/0216482 A1    Jul. 15, 2021

(30) Foreign Application Priority Data

May 30, 2018  (GB) ...................................... 1808820

(51) Int. Cl.
*G06F 13/28* (2006.01)
(52) U.S. Cl.
CPC .......... *G06F 13/28* (2013.01); *G06F 2213/28* (2013.01)

(58) Field of Classification Search
None
See application file for complete search history.

(56) References Cited

U.S. PATENT DOCUMENTS

| 5,001,624 A | 3/1991 | Hoffman et al. |
| 5,625,842 A | 4/1997 | Dalrymple |

(Continued)

FOREIGN PATENT DOCUMENTS

JP    H10 116245 A    5/1998

OTHER PUBLICATIONS

IPO Search Report under Section 17(5) for GB 1808820.3, dated Nov. 29, 2020, 4 pages.

(Continued)

*Primary Examiner* — Henry Tsai
*Assistant Examiner* — Christopher A Bartels
(74) *Attorney, Agent, or Firm* — Klarquist Sparkman, LLP (57) ABSTRACT

An electronic apparatus has a processor; a peripheral having a data interface and a data-attribute interface; a direct memory access (DMA) controller for the peripheral; a memory; a bus system connecting the processor, the DMA controller, and the memory; a data link between the DMA controller and the peripheral; and a data-attribute link between the DMA controller and the peripheral, separate from the data link. The DMA controller has data-transfer circuitry for transferring data between the memory and the data interface of the peripheral over the data link, and for transferring data-attribute information, associated with the data, between the memory and the data-attribute interface of the peripheral over the data-attribute link.

20 Claims, 6 Drawing Sheets

(56) References Cited

U.S. PATENT DOCUMENTS

| | | | | |
|---|---|---|---|---|
| 8,677,044 | B1* | 3/2014 | Gandhi | G06F 13/28 |
| | | | | 710/308 |
| 10,185,675 | B1* | 1/2019 | Seshadri | G06F 13/28 |
| 10,579,591 | B1* | 3/2020 | Diamant | G06F 16/1727 |
| 2003/0126322 | A1 | 7/2003 | Micalizzi, Jr. et al. | |
| 2007/0255864 | A1* | 11/2007 | Moriwaki | G06F 13/28 |
| | | | | 710/22 |
| 2009/0006808 | A1* | 1/2009 | Blumrich | G06F 15/17337 |
| | | | | 712/12 |
| 2013/0097600 | A1* | 4/2013 | Cardona | G06F 9/45558 |
| | | | | 718/1 |
| 2014/0149637 | A1* | 5/2014 | Gu | G06F 13/12 |
| | | | | 711/103 |
| 2015/0370700 | A1* | 12/2015 | Sabol | G06F 3/0679 |
| | | | | 711/103 |
| 2017/0187846 | A1* | 6/2017 | Shalev | G06F 15/17331 |
| 2017/0212784 | A1* | 7/2017 | Johnsen | H04L 49/358 |
| 2018/0005670 | A1* | 1/2018 | Lee | G11C 7/1072 |
| 2019/0102346 | A1* | 4/2019 | Wang | G06F 16/906 |
| 2021/0117360 | A1* | 4/2021 | Kutch | G06F 13/4027 |
| 2021/0232528 | A1* | 7/2021 | Kutch | G06F 9/44505 |

OTHER PUBLICATIONS

International Search Report and Written Opinion for PCT/EP2019/063821, dated Aug. 2, 2019, 12 pages.

\* cited by examiner

DIRECT MEMORY ACCESS CONTROLLER

CROSS REFERENCE TO RELATED APPLICATIONS

This is the U.S. National Stage of International Application No. PCT/EP2019/063821, filed May 28, 2019, which was published in English under PCT Article 21(2), which in turn claims the benefit of Great Britain Application No. 1808820.3, filed May 30, 2018.

BACKGROUND OF THE INVENTION

This invention relates to electronic apparatus and methods involving a direct memory access (DMA) controller.

It is known for an electronic apparatus, such as a system-on-chip device, to use a DMA controller to transfer data between a memory and a peripheral (such as an input/output module, a digital-to-analogue converter, a cryptoprocessor, etc.) without requiring a processor to move the data. This can result in better performance and/or power savings by freeing the processor up to perform other tasks or by allowing the processor to enter a low-power sleep state while the data is being transferred. Software executing on the processor can set up the transfer by providing suitable instructions to the DMA controller in advance (e.g., source and/or destination memory addresses), and then initiating the transfer. The DMA controller may interrupt the processor once the transfer is complete.

In some existing systems, peripherals are able to receive or output data of different types—e.g., a cipher engine may receive key data, initialisation-vector data, and plaintext data, and may output ciphertext data. When sending data to such a peripheral via a DMA controller, the processor indicates the type or amount of data that is being transferred by providing data-attribute information to the peripheral so that the peripheral knows how to handle the data appropriately. This data-attribute information can be provided before or during the data transfer—e.g., by the processor writing the information to a data-attribute input hardware register of the peripheral. When the DMA controller is used to transfer data out of the peripheral, the processor again sends data-attribute information to the peripheral (e.g., by writing to the same data-attribute input hardware register, or to a different register), which tells the peripheral what type of data to send to the DMA controller when the DMA controller next requests data from the peripheral.

While such systems can provide significant performance improvements compared with systems that do not have DMA controllers, the present inventors have realised that further performance improvements are possible.

The present invention thus seeks to provide methods and apparatus that support more efficient direct memory access.

SUMMARY OF THE INVENTION

From a first aspect, the invention provides an electronic apparatus comprising: a processor;
 a peripheral comprising a data interface and a data-attribute interface;
 a direct memory access (DMA) controller for the peripheral;
 a memory;
 a bus system connecting the processor, the DMA controller, and the memory;
 a data link between the DMA controller and the peripheral; and
 a data-attribute link between the DMA controller and the peripheral, separate from the data link,
wherein the DMA controller comprises data-transfer circuitry for transferring data between the memory and the data interface of the peripheral over the data link, and for transferring data-attribute information, associated with the data, between the memory and the data-attribute interface of the peripheral over the data-attribute link.

From a second aspect, the invention provides a method of operating an electronic apparatus, the electronic apparatus comprising:
 a processor;
 a peripheral comprising a data interface and a data-attribute interface;
 a direct memory access (DMA) controller for the peripheral;
 a memory;
 a bus system connecting the processor, the DMA controller, and the memory;
 a data link between the DMA controller and the peripheral; and
 a data-attribute link between the DMA controller and the peripheral, separate from the data link,
wherein the method comprises:
 transferring data between the memory and the data interface of the peripheral over the data link; and
 transferring data-attribute information, associated with the data, between the memory and the data-attribute interface of the peripheral over the data-attribute link.

Thus it will be seen that, in accordance with the invention, a dedicated data-attribute link is provided between the DMA controller and the peripheral. This allows the DMA controller to send data-attribute information to the peripheral, or receive data-attribute information from the peripheral, rather than requiring the processor to transfer the attribute information to the peripheral. This allows the processor to attend to other tasks, or to be in a low-power state, for longer. It can also make the apparatus easier to program by simplifying the synchronisation between the processor and the DMA controller.

Particularly beneficially, the data-attribute link can allow the DMA controller to perform a sequence of two or more data transfers, which may have different associated data attributes, without the processor having to be involved at any point during the execution of the sequence of transfers. This is made possible by the data-attribute link, since this avoids the need to interrupt the processor after each transfer in order for the processor to transfer the data-attribute information for the next transfer in the sequence.

The apparatus may comprise a plurality of peripherals. The DMA controller may have respective data links and data-attribute links to each of the plurality of peripherals. However, in other embodiments, the DMA controller has a data link and data-attribute link only to the one peripheral.

The DMA controller may be a receive DMA controller. It may comprise receive data-transfer circuitry for fetching the data and the associated data-attribute information from the memory, over the bus system; for sending the data-attribute information to the data-attribute interface of the peripheral, over the data-attribute link; and for sending the data to the data interface of the peripheral, over the data link.

The DMA controller may be a transmit DMA controller. It may comprise transmit data-transfer circuitry for receiving the data-attribute information from the data-attribute interface of the peripheral, over the data-attribute link; and for receiving the data from the data interface of the peripheral, over the data link. The transmit data-transfer circuitry may further be configured for determining an address in the memory in dependence on the received data-attribute information; and for writing the received data to the determined address in the memory, over the bus system.

A single DMA controller may comprise both such receive data-transfer circuitry and such transmit data-transfer circuitry. Alternatively, a peripheral may be connected to a receive DMA controller and/or to a transmit DMA controller that is separate from the receive DMA controller. Thus the apparatus may comprise such a receive DMA controller for the peripheral and a transmit DMA controller for the peripheral. The receive DMA controller and transmit DMA controller may have separate respective data links to the peripheral. They may have separate respective data-attribute links to the peripheral. In one set of embodiments, the DMA controller is a receive DMA controller, and the transmit DMA controller has a data link from the peripheral but no data-attribute link.

The data interface of the peripheral may comprise a data buffer, such as a first-in first-out (FIFO) buffer. The data-attribute interface may be or may comprise a hardware register. The data link may be a serial link or a parallel link. The data-attribute link may be a serial link or a parallel link. The data link is preferably separate from the bus system. Similarly the data-attribute link is preferably separate from the bus system. The data link and data-attribute link are preferably not connected to any components other than the DMA controller and the peripheral.

The DMA controller may be a bus master on the bus system.

The peripheral may be directly connected to the bus system (i.e., separately from the DMA controller); the peripheral may be a slave on the bus system. The peripheral may be configured to receive configuration data from the processor other than through the DMA controller. It may comprise a configuration register interface, accessible over the bus system—e.g., over an Arm Advanced Peripheral Bus (APB).

The DMA controller may be configured to fetch a job list from the memory. The job list may comprise one or more of: a memory address, data, a data length, and the data-attribute information. The job list may comprise one or more tuples (representing respective jobs), each tuple comprising or consisting of an address, a length value, and a data-attribute value. The job list may occupy a contiguous region in the memory. It may comprise an end marker, which may a predetermined value, such as a zero address value. The memory address or addresses may point to data for transferring to the peripheral over the data link, or to a region of memory for receiving data transferred from the peripheral over the data link. The memory may store one or more such job lists. The DMA controller may comprise job-list interpretation logic for interpreting (parsing) a job list.

The DMA controller may comprise a hardware job-list-address register for receiving the address of a job list. This register may be writable by the processor. The DMA controller may be configured to read a job list from the address in the job-list-address register. The DMA controller may comprise a job-list-length register for receiving a length of the job list; alternatively, the DMA controller may simply continue parsing a job list until it detects an end marker.

A receive DMA controller may comprise job-list interpretation logic for processing a job list in sequence, the job list encoding one or more receive jobs. For each successive receive job, the receive DMA controller may identify, from the job list, data-attribute information and a location of associated data in the memory. It may then transfer the data-attribute information to the peripheral over the data-attribute link, and transfer the data to the peripheral over the data link. These transfers may happen separated in time (e.g., with the data following immediately after the attribute information), but preferably they are sent simultaneously. The same data-attribute information may be sent continuously while the data is being sent.

A transmit DMA controller may comprise job-list interpretation logic for processing a job list in sequence (e.g., in embodiments where data-attribute information from the peripheral is not used), or it may comprise job-list interpretation logic for processing a job list conditionally. The job list may contain a respective transmit job for each of a set of data-attribute values. For each job, the transmit DMA controller may identify, from the job list, data-attribute information and a location in the memory to which data having that attribute is to be written. The transmit DMA controller may receive data-attribute information from the peripheral over the data-attribute link and may select a job from the job list in dependence on the data-attribute information (i.e., conditional processing). The transmit DMA controller may write data it receives from the peripheral to a memory address determined from the job list (e.g., from the selected job). The memory address could depend on data-attribute information received in association with the data (e.g., simultaneously), or it could depend on the order of a sequence of jobs in the job list.

The peripheral or the DMA controller may be configured to generate an interrupt to the processor in response to completing the transfer of data. For a receive DMA controller, this may be once the end marker of a receive job list is reached. For a transmit DMA controller, this may be once the peripheral has no more data to output to a transmit DMA controller. In some embodiments, the receive DMA controller does not generate an interrupt upon reaching the end of a job list, but the transmit DMA controller instead generates an interrupt once the peripheral has finished transmitting data generated as a result of the job list. This allows the processor to be uninterrupted throughout the entire execution of a receive job list and a corresponding transmit job list.

The data-attribute information may be a value from a predetermined set of data-attribute values. The peripheral may be configured to receive data of a plurality of different types, and to process the data differently according to its type. The data-attribute information may represent said types.

One of the data attributes may be a bypass attribute. The peripheral may be configured to perform no logical processing of bypass data (i.e., to perform no logical operation or calculation whose result depends on the data) received from a receive DMA controller, but simply to transmit the same data to the DMA controller, or to a separate transmit DMA controller. In this way, the DMA controller(s) and the peripheral can be used as a memory-to-memory scatter-gather DMA engine for certain data by marking the data as bypass data in a receive job list.

In general, the DMA controller may modify the data and/or the data-attribute information between how it is stored in the memory and how it is received or transmitted by the peripheral, or it may transfer it unmodified. It may, for example, encode the attribute information differently, or it may perform a word alignment operation on the data.

In one set of embodiments, the peripheral is a hardware cryptographic engine (i.e., a crypto-processor). It may be configured to perform one or more cryptographic operations, such as stream or block cipher operation. In this case, the data-attribute information may include a key attribute, for use when sending a cryptographic key to the cryptographic engine. It may also include a message attribute, or a plaintext attribute, or a ciphertext attribute, for sending message data to the cryptographic engine. It may also include an initialisation-vector (IV) attribute, for sending IV data to the cryptographic engine. It may also include the bypass attribute, described above, which may be particularly useful in certain cryptographic operations that involve processing only some parts of a block of input data, while leaving other parts unmodified.

The use of job lists, as described herein, can enable the cryptographic engine to perform the encryption and/or decryption of one or more messages with just a single software register write. The processor may then be interrupted once all of the sequence of cryptographic operations has completed and the output data has been transferred to the memory.

Of course, a cryptographic engine is just one example, and the peripheral could instead be an ADC, DAC, digital filter, PWM, USB interface, SPI interface, UART, Bluetooth™ radio, LTE radio, etc.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
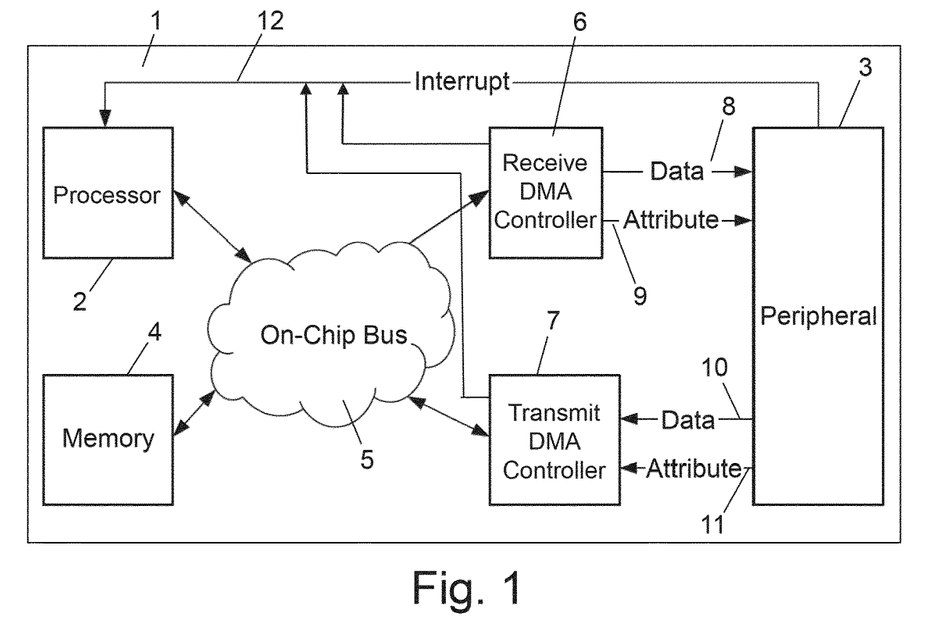
FIG. 1 is a schematic drawing of a system-on-chip device embodying the invention.

FIG. 1 shows a system-on-chip device 1 that includes a processor 2—e.g., an Arm™ Cortex™-M4. The device 1 also has a peripheral 3 and a memory 4. The peripheral 3 could be any peripheral, such as an input/output, a cryptoprocessor, a DAC, an ADC, a radio, etc. The memory 4 may include volatile memory (e.g., SRAM) and/or non-volatile memory (e.g., flash). The memory 4 can store software instructions for execution by the MCU 2 as well as persistent and transient data. The device 1 has an on-chip bus system 5 which supports memory-mapped peripheral access. The bus system 5 may be an Arm™ AMBA™ bus system; it may include one or more AHB's (Advanced High-Performance Bus) and/or one or more APB's (Advanced Peripheral Bus). The device 1 may, of course, have further peripherals, further processors, and any other typical components such as interrupt controllers, etc., which are not shown here.

The peripheral 3 is connected to the bus system 5 via a receive (Rx) DMA controller 6 and a transmit (Tx) DMA controller 7. These DMA controllers 6, 7 are both bus masters on the bus system 5 and enable direct memory access data transfers between the peripheral 3 and the memory 4. They may also facilitate peripheral-to-peripheral communication in some embodiments. The peripheral 3 may have further connections (not shown) to the bus system 5—e.g., for allowing the processor 2 to write to and/or read from a register interface of the peripheral 3.

The receive (Rx) DMA controller 6 is connected to the peripheral by a receive data link 8, for sending data to the peripheral 3, and a receive data-attribute link 9, for sending data-attribute information to the peripheral 3.

The transmit (Rx) DMA controller 7 is connected to the peripheral by a transmit data link 10, for sending data to the peripheral 3, and a transmit data-attribute link 11, for sending data-attribute information to the peripheral 3.

Each of these links 8, 9, 10, 11 consists of one or more wires. In some embodiments, each of the data links 8, 10 consists of 32 parallel lines, while each of the data-attribute links 9, 11 consists of eight parallel lines. The data-attribute links 9, 11 are distinct from the data links 8, 10.

The DMA controllers 6, 7 could provide DMA access to multiple peripherals. However, in this embodiment the DMA controllers 6, 7 serve only the one peripheral 3; any further peripherals that require DMA access would have their own respective receive and/or transmit DMA controllers.

An interrupt channel 12 allow the peripheral 3 and DMA controller 6, 7 to issue interrupts to the processor 2. These may travel along one or more direct lines to the processor 2, or via a programmable interrupt controller (not shown).

The peripheral 3 is able to receive and/or output multiple types of data.

How the peripheral 3 processes incoming data, received over the receive data link 8, depends on associated data-attribute information it receives over the data-attribute link 9. An association between data-attribute information and data may be indicated temporally—e.g., by the DMA controller 6 maintaining the data-attribute 9 link at a particular value, representing a particular attribute, continuously while simultaneously sending the data having that attribute over the data link 8.

Similarly, the peripheral 3 may communicate an attribute associated with data that it outputs over the transmit data link 10 by asserting a particular value on the transmit attribute link 11 while outputting the data. Alternatively, the attribute information could be sent immediately preceding the data, or using some other temporal connection to convey an association between the data and the data-attribute information. How the device 1 responds to data output from the peripheral 3 may depend on the associated data-attribute information that is sent by the peripheral 3 over the transmit data-attribute link 11 (although this need not always be the case; for example, sometimes software executing on the processor 2 may ignore output attribute information if it already knows what type of data to expect from the context).

In use, software code stored in the memory 4 is executed by the processor 2. Among other things, the code can contain instructions for initiating data transfers between the memory 4 and the peripheral through the DMA controllers 6, 7. Once the code has set up the appropriate instructions, the DMA controllers 6, 7 can then perform complex transfer sequences without the need for further involvement by the processor 2 until the transfers have been completed.

Figure 2:
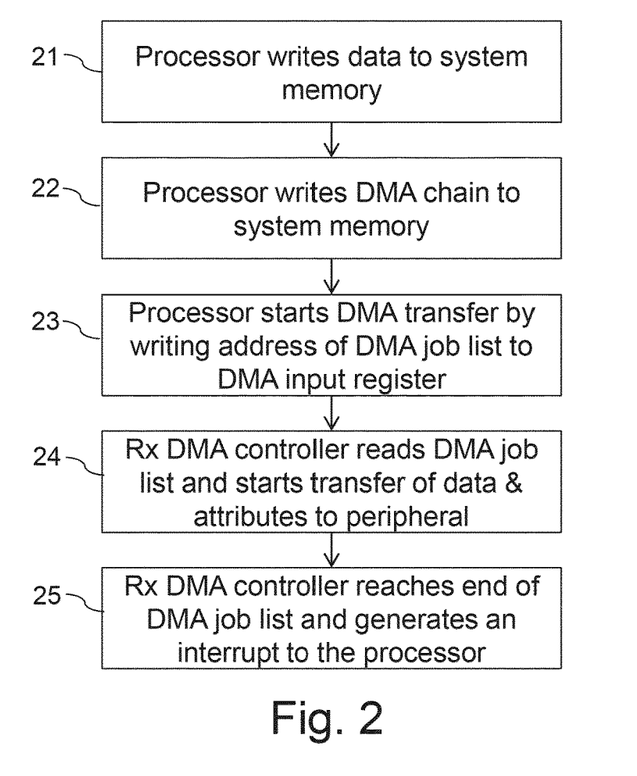
FIG. 2 is a flow chart of operations performed by the second device during a DMA transfer to the peripheral.

FIG. 2 outlines the main steps that are performed by the device 1 when transmitting data to the peripheral 3 from the memory 4 using the receive DMA controller 6.

In a first step 21 the processor 2 writes the data to be sent to the peripheral 3 to the memory 4.

In a second step 22, the processor 2 writes a DMA receive job list (also referred to herein as a DMA chain) to an address in the memory 4. This DMA receive job list is a set of instructions for the receive DMA controller 6 and includes information concerning the location of the data in the memory 4 and the attribute information associated with the data, specifying the type of data that is stored. The format of the DMA receive job list is explained in more detail below.

In a third step 23, the processor 2 initiates the DMA transfer to the peripheral 3 by writing the start address of the DMA receive job list to an input register of the receive DMA controller 6.

In a fourth step 24, this writing of the start address triggers the receive DMA controller 6 to start reading the DMA receive job list from the memory 4 and to follow the instructions contained in the DMA job list for performing the desired memory transfer operation or operations, reading the data from the memory 4 and sending it over the data.

In a fifth step 25, the receive DMA controller 6 determines that it has reached the end of the DMA receive job list and, in response, generates an interrupt to the processor over the interrupt channel 12. In some cases this step may be omitted—e.g., if the processor 2 does not need to be interrupted until the peripheral 3 has processed the received data and potentially provided some output via the receive DMA controller 6.

Figure 3:
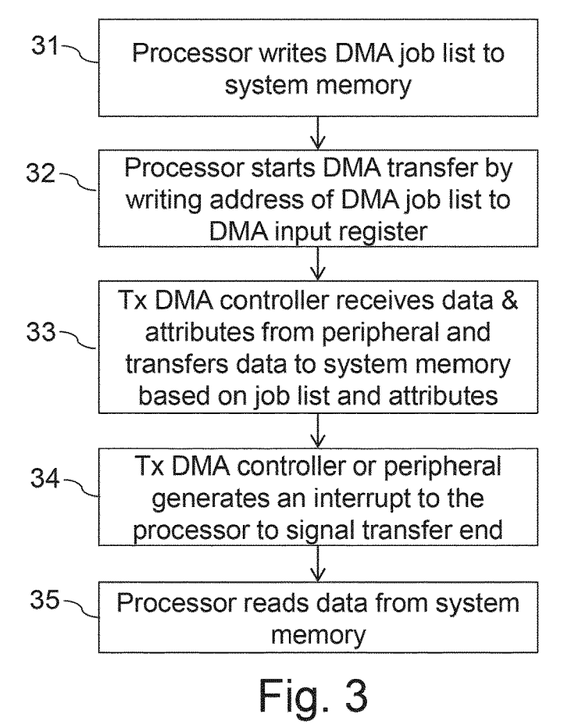
FIG. 3 is a flow chart of operations performed by the second device during a DMA transfer from the peripheral.

FIG. 3 outlines the main steps that are performed by the device 1 when transferring data from the peripheral 3 to the memory 4 using the transmit DMA controller 7.

In a first step 31 the processor 2 writes a DMA transmit job list to an address in the memory 4. This DMA transmit job list is a set of instructions for the transmit DMA controller 7. It includes information concerning where in the memory 4 the transmit DMA controller 7 should write data having different attributes which the DMA controller 7 receives from the peripheral 3. The format of the DMA job list is explained in more detail below.

In a second step 32, the processor 2 initiates the DMA transfer from the peripheral 3 by writing the start address of the DMA transmit job list to an input register of the transmit DMA controller 7.

In a third step 33, this writing of the start address triggers the transmit DMA controller 7 to read the DMA transmit job list from the memory 4 and to start receiving data and data-attribute information from the peripheral 3. The transmit DMA controller 7 uses the transmit job list to determine where in the memory 4 to write the received data, based on the attribute information output by the peripheral 3.

In a fourth step 34, the peripheral 3 determines that it has finished outputting data, or the transmit DMA controller 7 determines that it has received a required amount of data, and the peripheral 3 or the transmit DMA controller 7 generates an interrupt to the processor over the interrupt channel 12.

In an optional fifth step 35, the processor 2 reads some or all of the output data from the memory 4.

Figure 4:
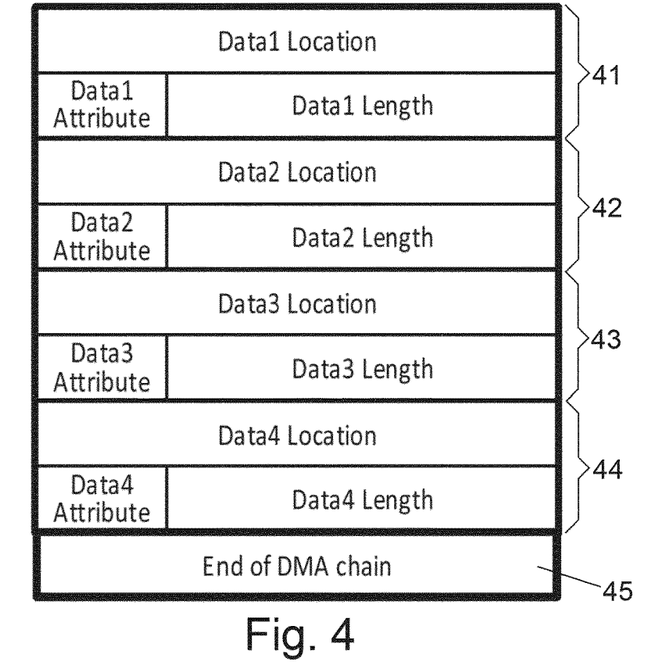
FIG. 4 is list of data stored in a DMA job list for use with the system-on-chip device.

FIG. 4 shows an example transmit or receive job list (DMA chain), which could be stored in the memory 4. This example includes four separate transfer instructions for four different data types. The job list starts with a first transfer 41 (Data1). This specifies a "Data1 location" field which contains a 32-bit address in the memory 4 from which the data is to be read, or to which the data is to be written. This is followed by an 8-bit "Data1 Attribute" field which contains an 8-bit value, from a predetermined set of attribute values, representing a type of data in a DMA transfer. Then there is a 24-bit "Data1 Length" field which contains a 24-bit value equal to the length of data that is to be read from, or written to, the Data1 location, expressed as a number of 32-bit words. This is followed by the same three fields for a second transfer 42 (Data2), a third transfer 43 (Data3) and a fourth transfer 44 (Data4). Individual DMA transfers are combined into a DMA job list by storing them sequentially into memory. Finally, the job list contains a predetermined end-marker value 45 (e.g., 32 zero bits instead of a further location field) which indicates the end of the job list. Of course, this is just one example, and other embodiments may use alternative data formats and values.

Figure 5:
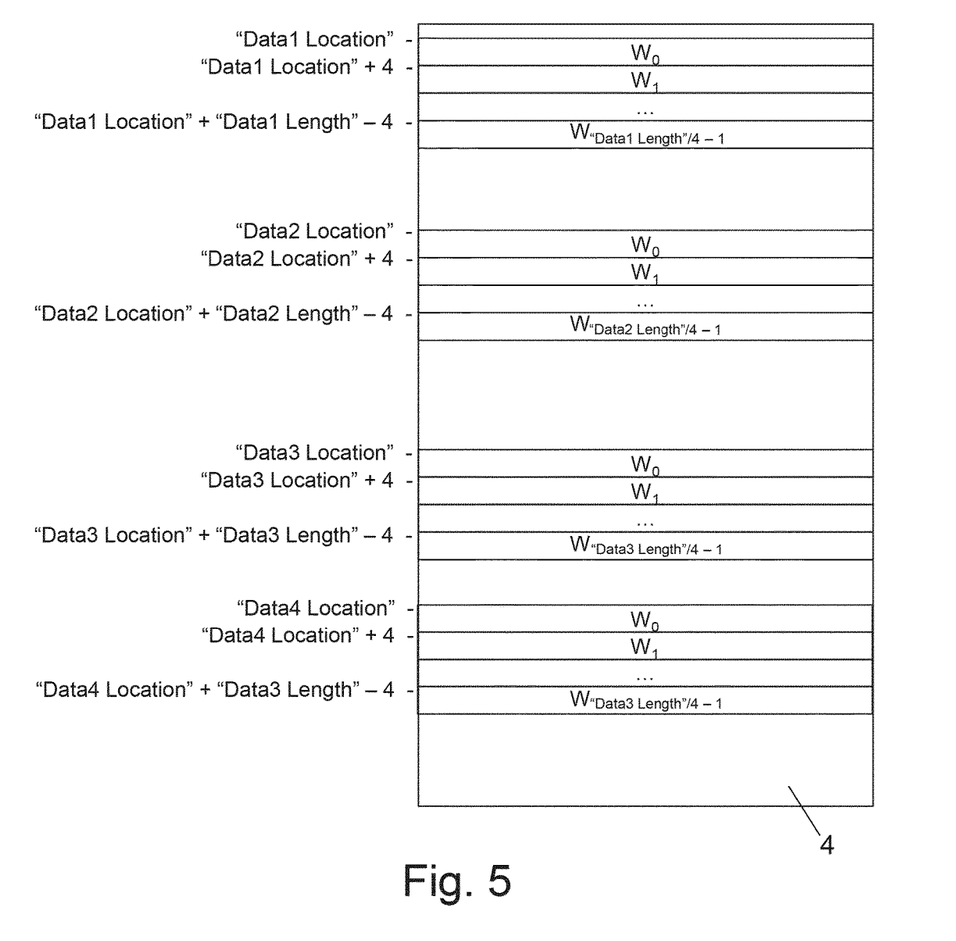
FIG. 5 is a table showing peripheral data stored in the memory of the device.

FIG. 5 shows an example of a data structure in the memory 4 that corresponds to the job list of FIG. 4. Note that, in this embodiment, the address values refer to respective 8-bit blocks, whereas the data is stored as 32-bit words. When the peripheral 3 is receiving data, as in the flow-chart of FIG. 2, this structure will be propagated with data by the processor 2 (see the first step 21). When the peripheral 3 is transmitting data, as in the flow-chart of FIG. 3, this structure will initially be empty, with just a suitable empty region of memory being allocated by the processor 2; it will be filled with data by the transmit DMA controller 7 (see the third step 33).

Figure 6:
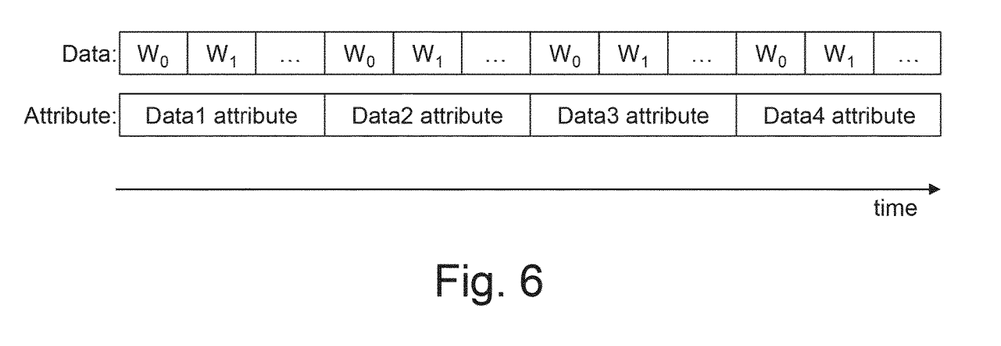
FIG. 6 is a time plot of data being received by a peripheral on the device over a data link and an attribute link.

FIG. 6 shows the transmissions that the receive DMA controller 6 makes over the receive data link 8 and the receive data-attribute link 9, over time, at the fourth step 24 in FIG. 2, when processing the job list of FIG. 4 in order to send data in the data structure of FIG. 5 to the peripheral 3. First, the receive DMA controller 6 sends the 8-bit "Data1 Attribute" value over the receive data-attribute link 9, and continues to assert this value for the duration of the associated data transmission. Simultaneously, it sends the "Data1 Length" quantity of 32-bit words, starting from the "Data1 Location" in the memory 4, over the data link 8. Once all the Data1 words have been sent, the receive DMA controller 6 changes the value on the receive data-attribute link 9 to "Data2 Attribute" and starts sending data from "Data2 Location". This process repeats until all four data transfers (Data1-Data4) have been completed. When the interpretation logic in the DMA controller 6 identifies the end-marker value 45, it ceases activity over the data link 8 and data-attribute link 9. In some embodiments, it triggers an interrupt on the processor 2. The peripheral 3 processes each of the four data transfers according to the associated data attribute values.

Transmissions from the peripheral to the transmit DMA controller 7 follow a similar pattern, but need not necessarily in the same sequential order as in the job list or as in the data structure of FIG. 5. Instead, in some embodiments, the transmit DMA controller 7 contains conditional-processing logic for performing conditional processing of the data received over the transmit data link 10 based on the attribute value that is simultaneously received over the transmit data-attribute link 11. The logic detects the attribute information and determines a corresponding memory address from the transmit job list. The transmit job list thus effectively functions as a switch statement (case statement).

In other embodiments, however, the peripheral 3 may output data of different types in a deterministic order, and the transmit DMA controller 7 may process the job list in sequence, writing successive quantities of data, equal to the "length" values in the job list, to the corresponding "location" addresses in the memory 4. In such cases any data-attribute information output by the peripheral 3 may be ignored, or there may not even be any transmit data-attribute link 11 present.

Figure 7:
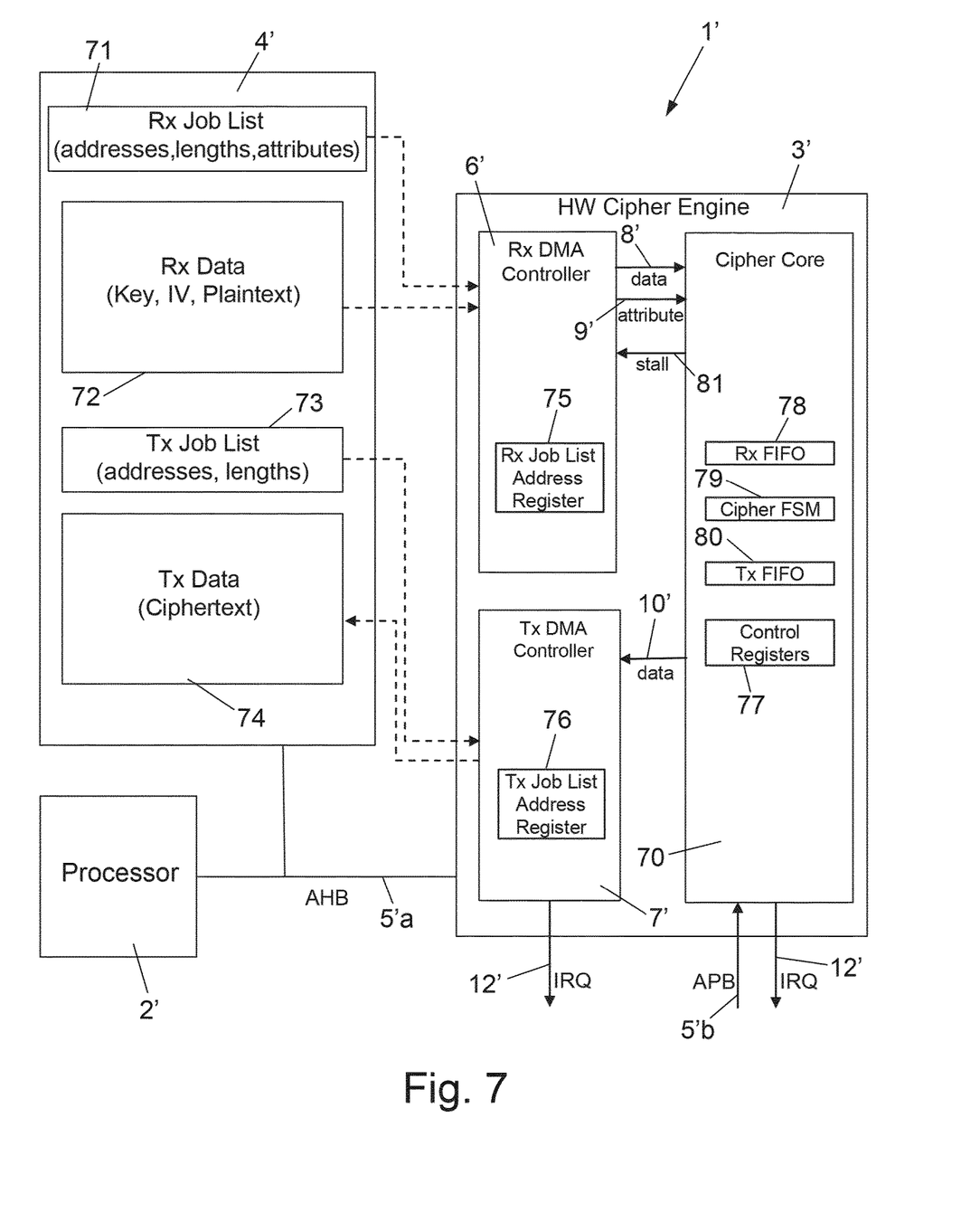
FIG. 7 is a schematic drawing of a second system-on-chip device, embodying the invention, that includes a hardware cipher engine.

FIG. 7 shows an exemplary embodiment of a system-on-chip device 1' having all of the same features as the device 1 of FIG. 1 (with like features references with the same reference numbers primed), but in which the peripheral is a hardware cipher engine 3' for encrypting or decrypting data—e.g., with a stream cipher such as AES or SNOW 3G.

In this embodiment, the Rx DMA controller 6' and Tx DMA controller 7' are shown as being components of the cipher engine 3' itself, in addition to a cipher core 70. This is merely to indicate that, this case, the DMA controllers 6', 7' serve only the cipher engine 3' and not any other peripherals.

A memory 4' (e.g., SRAM) stores a receive (Rx) job list 71 and receive (Rx) data 72 to be received by the cipher engine 3'. The Rx data 72 includes key data, initialisation-vector (IV) data, and plaintext data to be encrypted using the key data and IV data. It may contain a plurality of each data type, for performing multiple successive encryption operations of different plaintext inputs. The Rx job list 73 includes the memory addresses and lengths of the key data, IV data and plaintext data. It also includes corresponding attribute information representing a "key" data type, an "IV" data type, and a "plaintext" data type, respectively. The Rx job list 71 and Rx data 72 have been written to the memory 4' by software executing on the processor 2'.

The processor 2' has also written a corresponding transmit (Tx) job list 73 to the memory 4', and has also reserved a transmit (Tx) data region 74, which is initially empty, for receiving the ciphertext that will be output by the cipher engine 3'.

The memory 4' and processor 2' are connected to the cipher engine 3' by an AHB 5'a. The cipher engine 3' may also be connected to an APB 5'b which may be used for accessing a register interface on the cipher engine 3'. In particular, the Rx DMA controller 6' has an Rx job-list address register 75, for receiving the address of the Rx job list 71; the Tx DMA controller 7' has a Tx job-list address register 76, for receiving the address of the Tx job list 73; and the cipher core 70 may have a set of control registers 77, e.g., for receiving configuration settings from the processor 2' such as what cipher algorithm to perform, or what block-cipher mode of operation to use (ECB, CBC, etc.), etc. The cipher core 70 also includes a receive buffer (Rx FIFO) 78 for receiving incoming data from the Rx DMA controller 6'; a cipher finite state machine (FSM) 79 for performing one or more cipher operations; and a transmit buffer (Tx FIFO) 80 for buffering outgoing data before it travels over the transmit data link 10' to the Tx DMA controller 7'.

Also shown in FIG. 7 is a stall link 81 between the Rx DMA controller 6' and the cipher core 70, by which the cipher core 70 may stall the transfer of incoming data over the receive data link 8'—e.g., when the Rx FIFO 78 is full.

In this particular embodiment, there is no transmit data-attribute link from the cipher core 70 to the Tx DMA controller 7', because the core 70 only ever outputs one type of data, being ciphertext (or plaintext, when performing a decryption operation).

The cipher block 70 requires three types of data for running the cipher algorithm: key, IV and stream/message data. An optional bypass type is also supported for data that doesn't need to be ciphered but merely passed through the cipher core 70 unchanged. This bypass type allows the cipher engine 3' to be used as a general-purpose memory-to-memory scatter-gather DMA engine.

In use, after generating the data structures in memory 4', the processor 2' writes the address of the Rx job list 71 to the Rx job-list address register 75 and writes the address of the Rx job list 73 to the Tx job-list address register 76. The software may also use the APB connection 5'b to write to the configuration registers 77 before the DMA job list starts—e.g. to select the cipher algorithm or mode.

The writing of the job-list addresses triggers the Rx DMA controller 6' and Tx DMA controller 7' to start transferring data to and from (respectively) the cipher core 70. Alternatively, a write to a start register in the cipher core 70's control registers 77 could initiate the transfer operations—e.g., by causing the cipher core 70 to deassert the stall link 81. Initially, there will be no data transmitted out from the cipher core 70 to the Tx DMA controller 7', while the initial bytes of plaintext are processed through the Rx FIFO 78 and cipher FSM 79, but after a while data may be flowing in and out of the cipher core 70 simultaneously. Once the cipher core 70 detects that there is no more incoming data from the Rx DMA controller 6', it generates an interrupt to the processor 2' over the interrupt line 12'. Alternatively, it could send an end signal to the Tx DMA controller 7' which could generate the interrupt. In this way, the processor 2' can be in a sleep state, or attending to other tasks, throughout the entire processing of the cipher job lists, which could comprise multiple encryption and/or decryption operations and/or memory-to-memory data moves, potentially involving multiple different keys and IV data. As before, the job lists 71, 73 are read sequentially until a null pointer 45' is read, indicating the end of the DMA chain.

This architecture is, of course, applicable to all kinds of ciphering algorithms.

Figure 8:
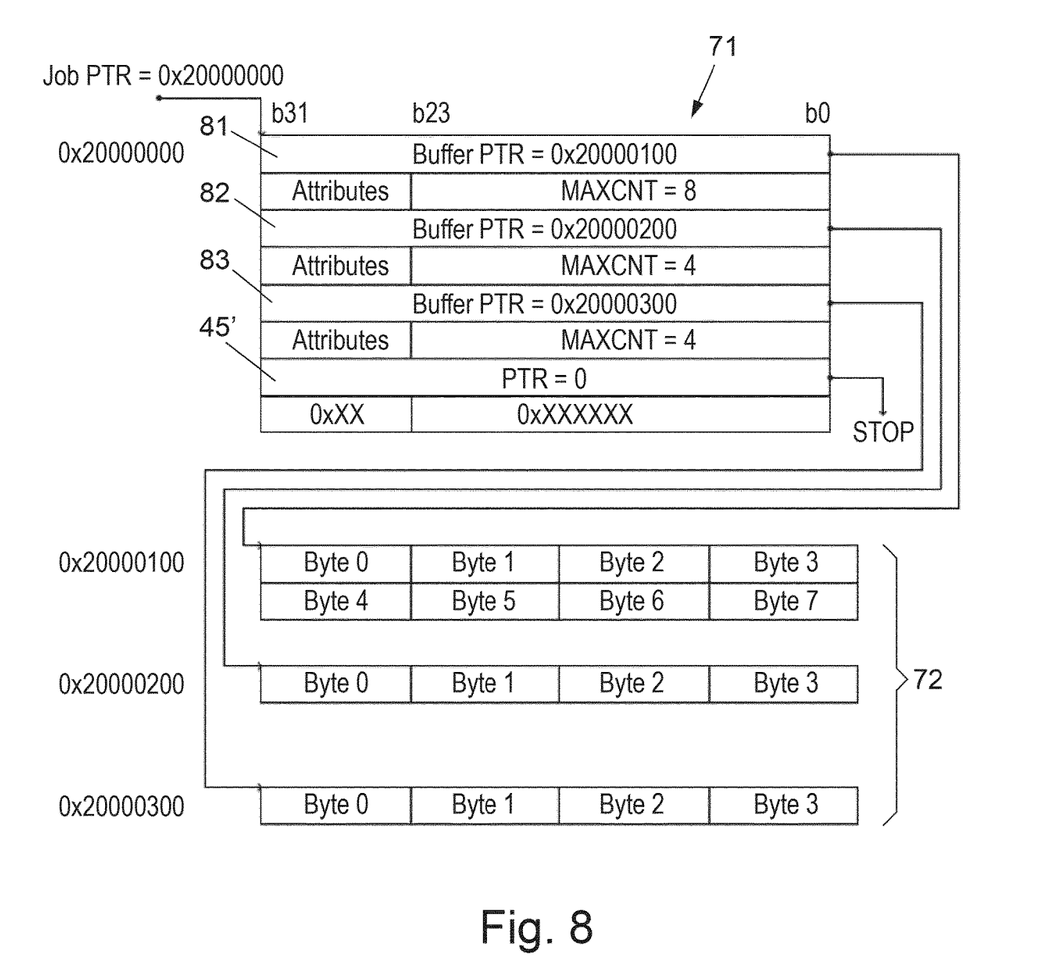
FIG. 8 is a schematic mapping between data in a DMA job list and cipher-related data stored in memory of the second device.

FIG. 8 shows an example receive job list 71. It is similar to the more generic example of FIG. 4, but contains three different data locations 81, 82, 83 rather than four. These could be the address 81 of a 64-bit key, the address 82 of a 32-bit IV, and the address 83 of a 32-bit message (e.g., for inputting to a RC5 encryption operation), with the actual data 72 being located at the indicated addresses. These location values 81, 82, 83 are accompanied by length values and attribute values, and are followed by an end marker 45'. Together, these constitute the Rx job list 4'.

Figure 9:
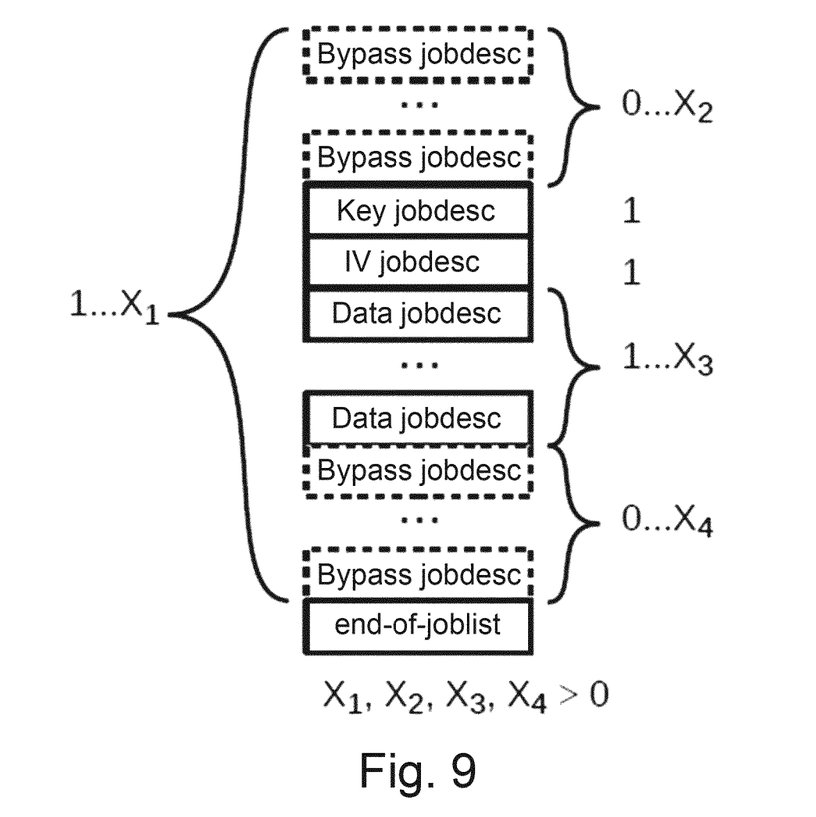
FIG. 9 is a first example DMA job list (chain) for sending data to the cipher engine.
Figure 10:
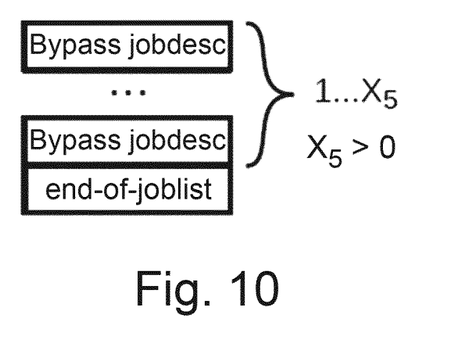
FIG. 10 is a second example DMA job list (chain) for sending data to the cipher engine.
Figure 11:
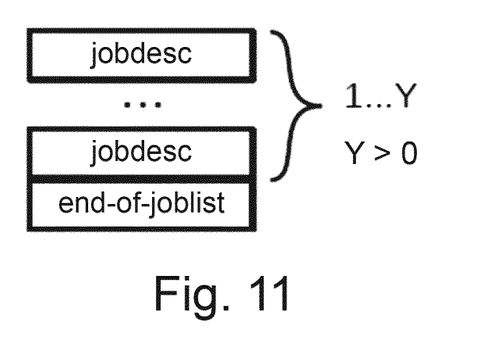
FIG. 11 is an example DMA job list for receiving data from the cipher engine.

FIGS. 9, 10 and 11 provide three further examples of receive and transmit job lists for operations that could be performing using the ciphering device 1' of FIG. 7.

FIG. 9 shows a receive job list containing several key+IV pairs. Each job description ("jobdesc") is a tuple of an address, a length and a data attribute, as previously described. The values $X_1$-$X_4$ represent repetition counts for the indicated bracketed sets of job descriptions. Data following a key+IV pair is ciphered with that key+IV pair.

The receive (input) job list shown here also includes data that bypasses the cipher FSM 79—i.e., which is just copied, unaltered, from the receive data link 8' to the transmit data link 10'. Such bypass data descriptors can be located before the first key descriptor or immediately preceding the end-of-joblist marker. Data intended for bypass is indicated by the processor writing a "bypass" data-attribute value in the job description tuple. This bypass facility can be useful in certain cryptographic operations.

FIG. 10 shows a receive job list which purely performs memory-to-memory transfers, without performing any cipher operations.

FIG. 11 shows a transmit job list consisting of one or more tuples of memory addresses, data lengths and attributes. However, in this case, the data attributes can be null, since the cipher core 3' does not output data-attribute information, so these are ignored by the Tx DMA controller 7'. Note that the Tx DMA controller 7' does not care if data to be output from the cipher core 70 has been ciphered or if it has bypassed the cipher FSM 79.

Assuming the cipher core 70 implements a cipher stream or block operation that outputs the same number of data blocks as it receives as input, the sum of the data lengths in the transmit job list will typically equal the sum of the cipher and bypass data lengths in the corresponding receive job list (but excluding key data and IV data).

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A system-on-chip (SOC) comprising:
a processor;
a peripheral comprising a data interface and a data-attribute interface;
a direct memory access (DMA) controller for the peripheral;
a memory;
a bus system connecting the processor, the DMA controller, and the memory;
a data link between the DMA controller and the peripheral, for transferring data between the DMA controller and the peripheral, wherein the data can be any of a plurality of different types of data; and
a data-attribute link between the DMA controller and the peripheral, separate from the data link, for transferring data-attribute information between the DMA controller and the peripheral, wherein the data-attribute information is associated with data transferred over the data link and represents a type, from the plurality of different types, of the data transferred over the data link,
wherein the processor, the peripheral, the DMA controller, the memory, the bus system, the data link and the data-attribute link are provided on the system-on-chip,
wherein the peripheral is separate from the processor,
wherein the DMA controller is separate from the processor, and
wherein the DMA controller comprises data-transfer circuitry for transferring data between the memory and the data interface of the peripheral over the data link, and for transferring data-attribute information, associated with the data, between the memory and the data-attribute interface of the peripheral over the data-attribute link.

2. The system-on-chip of claim 1, wherein the DMA controller comprises receive data-transfer circuitry for:
fetching data and associated data-attribute information from the memory, over the bus system;
sending the data-attribute information to the data-attribute interface of the peripheral, over the data-attribute link; and
sending the data to the data interface of the peripheral, over the data link.

3. The system-on-chip of claim 1, wherein the DMA controller comprises transmit data-transfer circuitry for:
receiving data-attribute information from the data-attribute interface of the peripheral, over the data-attribute link;
receiving data from the data interface of the peripheral, over the data link;
determining an address in the memory in dependence on the received data-attribute information; and
writing the received data to the determined address in the memory, over the bus system.

4. The system-on-chip of claim 1, wherein the data link and the data-attribute link are separate from the bus system.

5. The system-on-chip of claim 1, wherein the data-attribute interface comprises a hardware register.

6. The system-on-chip of claim 1, wherein the data interface of the peripheral comprises a first-in first-out (FIFO) buffer.

7. The system-on-chip of claim 1, wherein the data link and the data-attribute link are not connected to any component other than the DMA controller and the peripheral.

8. The system-on-chip of claim 1, wherein the peripheral comprises a direct connection to the bus system, separate from the DMA controller, for receiving configuration data from the processor over the direct connection.

9. The system-on-chip claim 1, wherein the DMA controller is configured to fetch a job list from the memory, the job list comprises one or more of: a memory address, data, a data length, and the data-attribute information, and wherein the DMA controller comprises job-list interpretation logic for interpreting a fetched job list.

10. The system-on-chip of claim 9, wherein the job-list interpretation logic is configured for interpreting a job list that comprises a plurality of job tuples, each job tuple comprising or consisting of: a respective memory address, a respective length value, and a respective data-attribute value.

11. The system-on-chip of claim 9, wherein the DMA controller comprises a hardware job-list-address register, writable by the processor, for receiving an address of a job list, and wherein the DMA controller is configured to read a job list from an address in the job-list-address register and to input the job list to the job-list interpretation logic.

12. The system-on-chip of claim 9, wherein the DMA controller comprises job-list interpretation logic for processing a job list in sequence, the job list encoding one or more receive jobs, wherein the DMA controller is configured, for each successive receive job, to:
identify, from the job list, data-attribute information and a location of associated data in the memory;
transfer the data-attribute information to the peripheral over the data-attribute link;
transfer the associated data to the peripheral over the data link.

13. The system-on-chip of claim 9, wherein the DMA controller comprises job-list interpretation logic for processing a job list in sequence, the job list encoding one or more transmit jobs, wherein the DMA controller is configured to:
receive data-attribute information from the peripheral over the data-attribute link;
select a job from the job list in dependence on the received data-attribute information;
identify, from the selected job, a memory address to which data received from the peripheral is to be written; and write data transferred to the DMA controller by the peripheral to the identified memory address.

14. The system-on-chip of claim 1, wherein the DMA controller or the peripheral is configured to generate an interrupt to the processor in response to completing the transferring of the data.

15. The system-on-chip of claim 1, wherein the peripheral is configured to receive data of a plurality of different types, and to process the data differently according to its type, wherein the data-attribute information represents the type of the data.

16. The system-on-chip of claim 1, wherein
the peripheral is a hardware cryptographic engine configured to perform a cryptographic operation;
the peripheral is configured to receive data-attribute information representing a key attribute from the DMA controller, and to receive data comprising a cryptographic key from the DMA controller; and
the peripheral is configured to receive data-attribute information representing a message attribute from the DMA controller, and to receive data comprising a message from the DMA controller, and to input the received data to the cryptographic operation.

17. The system-on-chip of claim 1, wherein:
the data link is a receive data link;
the data-attribute link is a receive data-attribute link;
the DMA controller is a receive DMA controller comprising receive data-transfer circuitry for:
fetching data and associated data-attribute information from the memory, over the bus system;
sending the data-attribute information to the data-attribute interface of the peripheral, over the receive data-attribute link; and
sending the data to the data interface of the peripheral, over the receive data link; and
wherein the electronic apparatus further comprises:
a transmit DMA controller; and
a transmit data link between the transmit DMA controller and a transmit interface of the peripheral, and
wherein the transmit DMA controller comprises transmit data-transfer circuitry for:
receiving transmit data from the transmit data interface of the peripheral, over the transmit data link; and
writing the received transmit data to an address in the memory, over the bus system.

18. The system-on-chip of claim 17, wherein the data-attribute information is a value from a predetermined set of data-attribute values, wherein one of the data-attribute values is a bypass attribute value, and wherein the peripheral is configured to perform no logical processing of data received from the receive DMA controller when the data-attribute information has the bypass attribute value, and is configured to transmit the data to the transmit DMA controller over the transmit data link.

19. The system-on-chip of claim 17, further comprising a transmit data-attribute link between the transmit DMA controller and the peripheral, separate from the transmit data link, for transferring transmit data-attribute information from the peripheral to the transmit DMA controller, wherein the transmit data-attribute information is associated with transmit data transferred over the transmit data link and represents a type, from a second plurality of different types, of the transmit data,
wherein the transmit DMA controller further comprises transmit data-transfer circuitry for:
receiving transmit data-attribute information from a transmit data-attribute interface of the peripheral, over the transmit data-attribute link;
determining an address in the memory in dependence on the received transmit data-attribute information; and
writing the received transmit data to the determined address in the memory, over the bus system.

20. A method of operating system-on-chip (SoC), the system-on-chip comprising:
a processor;
a peripheral comprising a data interface and a data-attribute interface;
a direct memory access (DMA) controller for the peripheral;
a memory;
a bus system connecting the processor, the DMA controller, and the memory;
a data link between the DMA controller and the peripheral, for transferring data between the DMA controller and the peripheral, wherein the data can be any of a plurality of different types of data; and
a data-attribute link between the DMA controller and the peripheral, separate from the data link, for transferring data-attribute information between the DMA controller and the peripheral wherein the data-attribute information is associated with data transferred over the data link and represents a type, from the plurality of different types, of the data transferred over the data link,
wherein the processor, the peripheral, the DMA controller, the memory, the bus system, the data link and the data-attribute link are provided on the system-on-chip,
wherein the peripheral is separate from the processor,
wherein the DMA controller is separate from the processor, and
wherein the method comprises:
transferring data of a first type, from the plurality of different types, between the memory and the data interface of the peripheral over the data link; and
transferring data-attribute information, associated with the data and representative of the first type, between the memory and the data-attribute interface of the peripheral over the data-attribute link.

* * * * *